UNITED STATES PATENT OFFICE.

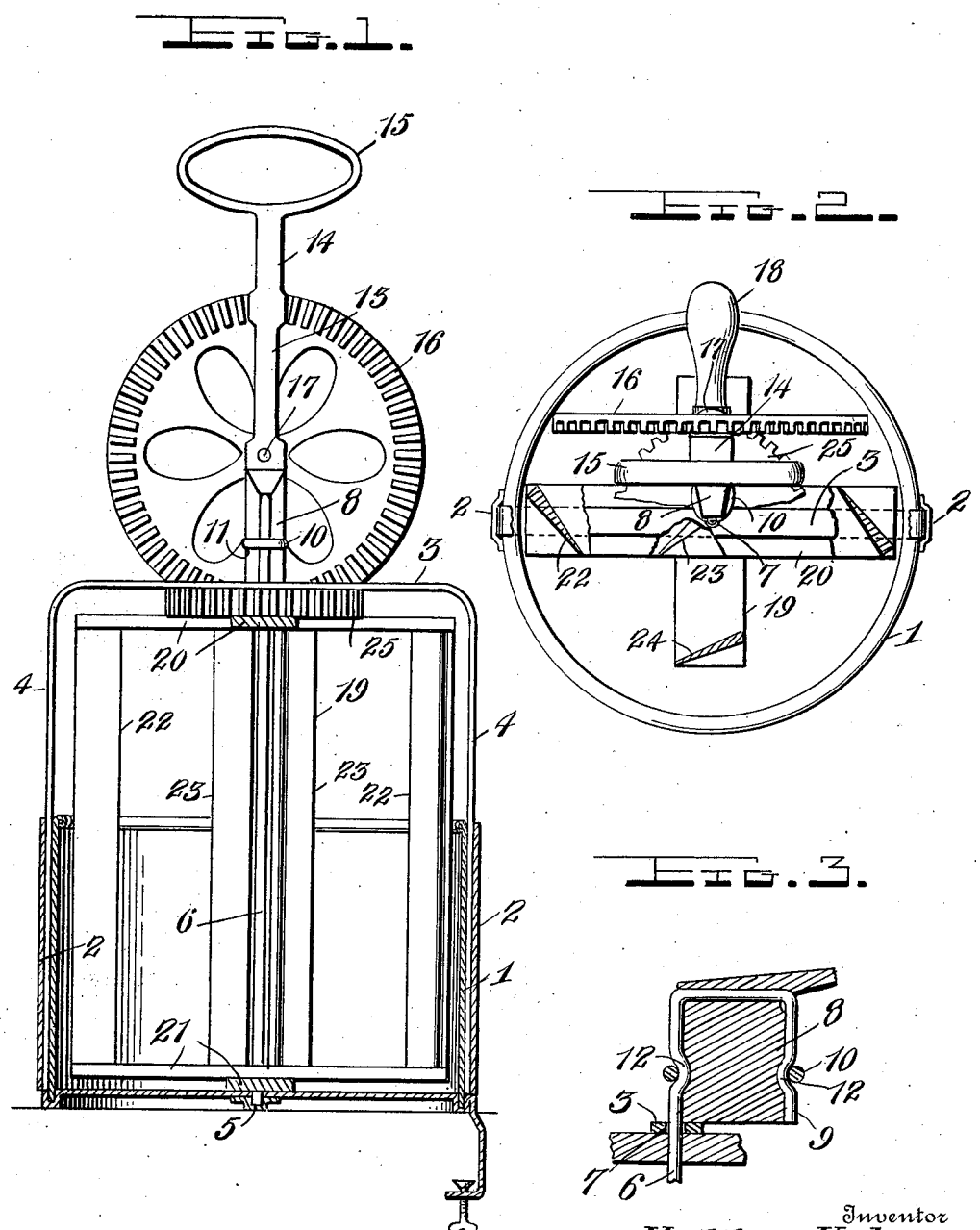

HATTIE KYLE, OF PARKINSON, MONTANA.

CAKE-MIXER.

1,019,055. Specification of Letters Patent. Patented Mar. 5, 1912.

Application filed June 14, 1911. Serial No. 633,062.

*To all whom it may concern:*

Be it known that I, HATTIE KYLE, a citizen of the United States, residing at Parkinson, in the county of Fergus and State of Montana, have invented certain new and useful Improvements in Cake-Mixers, of which the following is a specification, reference being had to the accompanying drawings.

This invention is an improved cake mixer or stirrer and consists in the construction, combination and arrangement of devices hereinafter described and claimed.

The object of my invention is to provide an improved machine of this character which is extremely cheap and simple, is very strong and durable and which has its parts so constructed and arranged that they may be readily disassembled to enable the device to be readily cleaned.

In the accompanying drawings—Figure 1 is a vertical sectional view of a cake mixer constructed in accordance with my invention; Fig. 2 is a plan of the same, partly in section; and Fig. 3 is a detail sectional view showing the upper portion of the shaft and also showing parts of the head, the cross bar and the stirrer gear.

In the embodiment of my invention I employ a cylindrical body or pan 1 of any suitable size, which is provided at diametrically opposite points with vertical keepers 2. A cross bar 3 is provided with parallel outwardly extending arms 4 which are placed in the keepers 2 and thereby the said cross bar may be detachably secured to the pan or body so as to extend across the same at an elevated point. In the center of the bottom of the pan or body is a bearing 5. A vertical shaft 6 has its lower end detachably stretched in the said bearings. At the center of the bar 3 is a bearing opening 7 through which the said shaft extends. A head 8 is attached to the upper end of the shaft 6 the latter having its upper end bent in the form of the inverted U and engaged in channels in the opposite side of the head and also extending through a transverse opening in the head, the arm 9 of the shaft 6 being secured to the head and also to the main portion of the said shaft by an open link or band 10 which engages a groove 11 that extends around the head, the shaft and its arm 9 being also provided with inset notches 12 for engagement by the said band. The head has a standard 13 which is opposite therefrom and extends vertically and terminates at its upper end in a curved upwardly extending arm 14 which has a handle 15 at its upper end. A crown wheel 16 rotates on a stub shaft 17 which projects from one side of the standard and the said crown gear is provided with a crank 18 whereby it may be manually rotated.

The stirrer 19 comprises upper and lower cross arms 20 and 21, blades 22 which connect the outer ends of the longer cross arms 20 and blades 23 which also connect the longer cross arms and are disposed near the center thereof and are slightly spaced apart. The blades 22 and 23 of the longer arms are disposed obliquely therein and in opposite relation to each other so that they present converging opposing sides. The shorter arms 21 are connected together by blades 24 which are also disposed obliquely. Hence, when the stirrer is revolved some of the blades force the material inwardly or toward the center of the pan or body and others force the material outwardly in the pan or body and hence the contents of the pan or body are thoroughly mixed and stirred. A spur gear 25 is secured to the upper end of the stirrer at the center thereof. The shaft 6 extends through central openings in the gear 25 and also in the upper and lower sides of the stirrer and hence the latter is mounted on the shaft for rotation and may be readily detached therefrom. The detachable bar 3 admits of the ready removal of the shaft and also of the stirrer from the pan or body. When the parts are assembled as shown in the drawings the gear 25 is engaged by the gear 16 and hence by rotating the latter, by means of its crank 18, rotary motion may be imparted to the stirrer so as to cause the contents of the pan or body to be thoroughly and very expeditiously mixed.

It will be understood that inasmuch as the parts of my stirrer may be readily disassembled the cleansing of the stirrer after the same has been used is greatly facilitated.

Having thus described my invention I claim:

The herein described cake mixer comprising a pan or body, a cross bar having downturned arms detachably connected to the pan or body, a vertical shaft having a bearing in the center of the cross bar and a bearing in the center of the bottom of the pan, a head at the upper end of the said shaft and having a handle, a gear wheel mounted on the head and having a crank and a stirrer revoluble on the shaft and having a gear engaged by the first mentioned gear, the stirrer and the shaft having detachable cross bars, the said stirrer being provided with vertical blades spaced apart and inclined in opposite directions.

In testimony whereof I hereunto affix my signature in the presence of two witnesses.

HATTIE KYLE.

Witnesses:
BENJIMAN F. COUNTER,
MARTHA LEAH MOSBY.

Copies of this patent may be obtained for five cents each, by addressing the "Commissioner of Patents, Washington, D. C."